United States Patent
Wafzig et al.

(10) Patent No.: US 6,949,045 B2
(45) Date of Patent: Sep. 27, 2005

(54) POWER DISTRIBUTED 2-RANGE TRANSMISSION

(75) Inventors: Jürgen Wafzig, Eriskirch (DE); Bernhard Sich, Friedrichshafen (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/679,555

(22) Filed: Oct. 6, 2003

(65) Prior Publication Data

US 2005/0075209 A1 Apr. 7, 2005

(30) Foreign Application Priority Data

Oct. 24, 2002 (DE) .......................... 102 49 484

(51) Int. Cl.⁷ .............................................. F16H 37/02
(52) U.S. Cl. ....................................................... 475/216
(58) Field of Search .............................. 475/209, 214–6

(56) References Cited

U.S. PATENT DOCUMENTS

| | | | |
|---|---|---|---|
| 5,238,460 A | * | 8/1993 | Esaki et al. .................. 475/216 |
| 5,453,061 A | * | 9/1995 | Fellows ........................ 475/215 |
| 5,931,760 A | * | 8/1999 | Beim et al. .................. 475/207 |
| 6,036,616 A | * | 3/2000 | McCarrick et al. ......... 475/214 |
| 6,155,951 A | * | 12/2000 | Kuhn et al. .................. 475/216 |
| 6,171,210 B1 | * | 1/2001 | Miyata et al. ............... 475/216 |
| 6,251,039 B1 | * | 6/2001 | Koga ........................... 475/216 |
| 6,561,942 B2 | * | 5/2003 | Wehking ..................... 475/216 |

FOREIGN PATENT DOCUMENTS

| | | | |
|---|---|---|---|
| DE | 196 29 213 A1 | 1/1998 | ........... F16H/37/08 |
| DE | 197 03 544 A1 | 8/1998 | ........... F16H/37/08 |
| DE | 198 36 558 A1 | 3/1999 | ........... F16H/37/08 |
| JP | 2000213621 A | 8/2000 | ........... F16H/37/02 |

* cited by examiner

Primary Examiner—Roger Pang
(74) Attorney, Agent, or Firm—Davis & Bujold, P.L.L.C.

(57) ABSTRACT

A power distributed 2-range transmission comprising one frictional wheel variator (1), one planetary gear (2) arranged coaxially to the frictional wheel variator (1), detachably connectable therewith via one shifting element (K2) and comprising two shifting elements (Kr, K1) and one lateral shaft (9) which connects the frictional wheel variator (1) with the planetary gear (2), the planetary gear (2) containing two minus planetary gear sets (3, 4).

3 Claims, 1 Drawing Sheet

POWER DISTRIBUTED 2-RANGE TRANSMISSION

This application claims priority from German Application Serial No. 102 49 484.3 filed Oct. 24, 2002.

FIELD OF THE INVENTION

This invention concerns a power distributed 2-range transmission which comprises one frictional wheel variator.

According to the preamble of claim 1, this invention concerns a power distributed 2-range transmission which comprises one frictional wheel variator.

BACKGROUND OF THE INVENTION

Continuously variable frictional wheel variators which have at least two torus discs with toroidal races between which roller bodies roll off are known from the prior art. Those frictional wheel variators have a great torque capacity, together with the continuously variable change of ratio.

DE 196 29 213 A1 has disclosed a transmission which can be operated in two power ranges. The essential component parts of said known toroidal transmissions are a continuous frictional wheel variator with two toroidal-shaped races interacting in pairs, one countershaft and one summarizing transmission. A power distribution is provided in the lower (LOW) range. The input power is passed by the input shaft, via a ratio reduction step, to the countershaft and then to the continuously variable transmission (frictional wheel variator) which, on the output side, is connected with the summarizing transmission. Via a second power branch, the input power is passed by the countershaft and a ratio reduction step directly to the summarizing transmission where the power of both power branches is added up and passed on to the output shaft.

In the second power range (HIGH) of this known transmission, the input power is passed, via a ratio reduction step, to the countershaft and then to the continuously variable transmission. One other power portion is not provided in this case.

The Applicant's DE 197 03 544 A1 has disclosed another transmission in which a power distribution is provided and a continuously variable transmission, particularly a transmission with toroidal shaped races interacting in pairs (toroidal transmission), is used. This known transmission also has one intermediate shaft or countershaft to make the desired power distribution possible. In addition, there is provided one planetary transmission with one plus planetary gear set which, depending on power range, either rotates as a unit or serves as summarizing transmission. In the transmission, according to DE 197 03 544 A1, in a first power range, the power is transmitted by the input shaft to the output shaft, via a frictional wheel variator, the planetary transmission rotating as a unit; in the second power range, on one hand, the power is transmitted to the planetary transmission, via the frictional wheel variator and, on the other, directly to the planetary transmission, the power being added up by the planetary transmission and passed to the output shaft.

By the use of a plus planetary gear set, the resulting efficiency of the toothing proves disadvantageous, especially with regard to the efforts of the technical world of offering optimal comfort combined with minimal consumption in the power train.

Departing from the known prior art, the problem on which this invention is based is to outline a transmission which combines the comfort advantages of a continuously variable transmission with an optimized efficiency of the whole transmission and thus with the advantage as to consumption resulting therefrom.

SUMMARY OF THE INVENTION

A power distributed 2-range transmission is proposed which comprises one frictional wheel variator and one planetary gear, said planetary gear containing two minus planetary gear sets.

By using a planetary gear, having two minus planetary gear sets, the efficiency of the toothing advantageously increases by up to 3%.

Within the scope of another advantageous embodiment of this invention, one Ravigneaux set can be substituted for the two minus planetary gear sets.

One other specially advantageous development of the transmission introduced here provides that there is used, as frictional wheel variator a continuously variable one-way frictional wheel variator, that is, a frictional wheel variator having only one inner and one outer toroidal disc whereby a very compact design is achieved.

In the inventive transmission, a power distribution is provided in the second upper (HIGH) range. In the first lower (LOW) range, the input power is brought by the input shaft to the output shaft, via the frictional wheel variator.

BRIEF DESCRIPTION OF THE DRAWING

The invention will now be described, by way of example, with reference to the accompanying drawings in which.

DETAILED DESCRIPTION OF THE INVENTION

Figure 1:
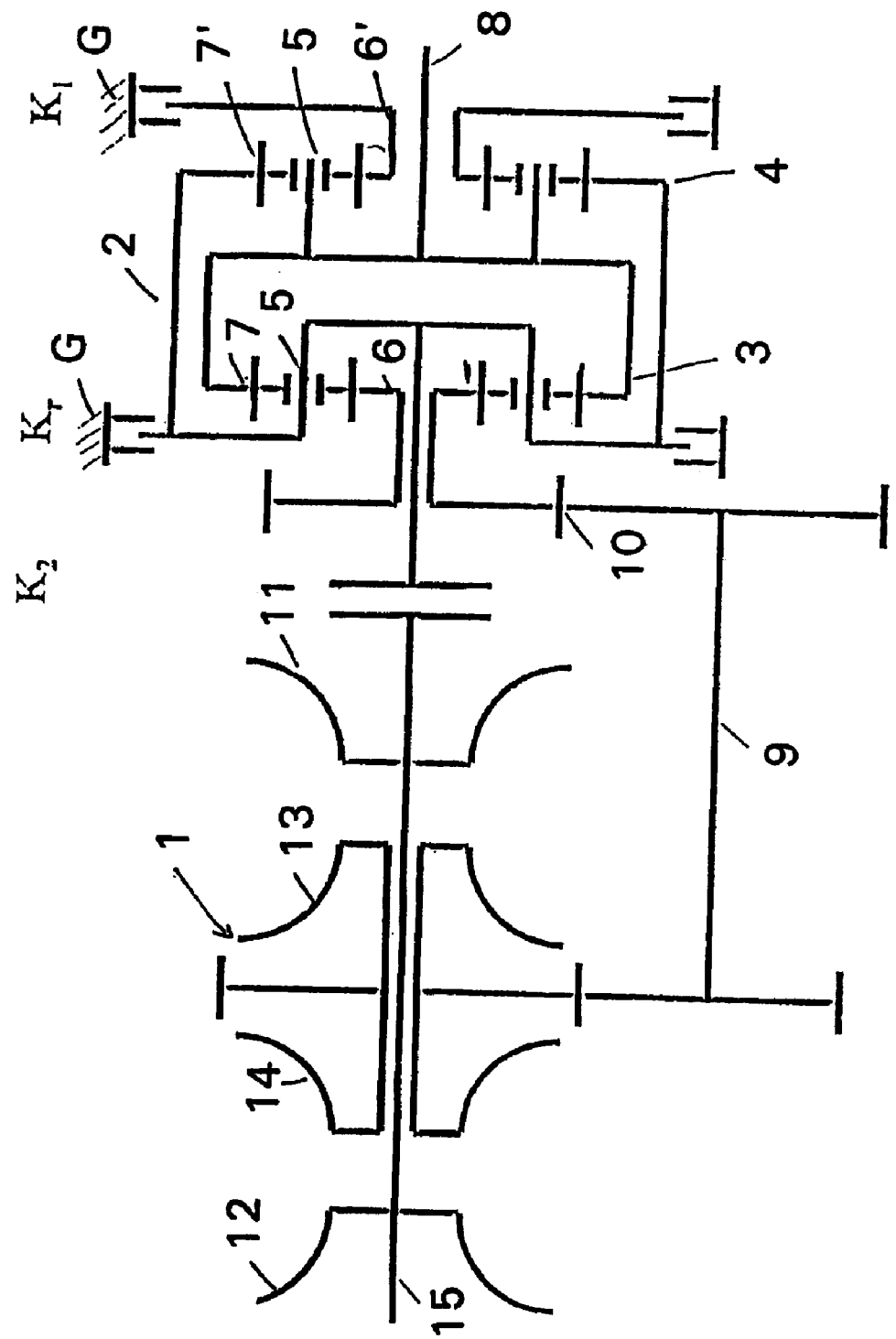
FIG. 1 shows a diagrammatic representation of a preferred embodiment of the inventive transmission and is particularly adequate for a vehicle having front engine and rear drive.

According to FIG. 1, the inventive power distributed 2-range transmission comprises one frictional wheel variator 1, there being arranged in power flow direction, coaxially behind the frictional wheel variator 1, one planetary gear 2 can be detachably connected with the frictional wheel variator 1 via one clutch K2.

The planetary gear 2 comprises two consecutively arranged minus planetary gear sets 3, 4 and two shifting elements Kr and K1 wherein a web 5 of the first minus planetary gear set is detachably connectable, via the brake Kr, with a housing G and the sun gear 6' of the second minus planetary gear set 4 can be detachably connected with the housing, via the brake K1. Besides, a ring gear 7' of the second minus planetary gear set 4 is connected with the web 5 of the first minus planetary gear set 3 and a web 5' of the second minus planetary gear set 4 with a ring gear 7 of the first minus planetary gear set 4 and of an output shaft 8.

In addition, the transmission comprises a lateral shaft 9 which connects the frictional wheel variator 1 with a sun gear 6 of the first minus planetary gear set 3, via a ratio reduction step 10.

The frictional wheel variator 1 comprises two outer toroidal discs 11, 12 which interact in pairs with the inner toroidal discs 13, 14, via roller bodies (not shown). The outer toroidal discs 11, 12 are non-rotatably connected with the main shaft or an input shaft 15; the inner toroidal discs 13, 14 are rotatably supported upon the input shaft 15 and connected with the lateral shaft 9.

In the inventive transmission, a power distribution is provided in the second upper (HIGH) range. In the first lower (LOW) power range, the input power is brought by the input shaft 15, via the frictional wheel variator 1, when the shifting element K1 is closed and the clutch K2 is open, via the lateral shaft 9, the ratio reduction step 10, the sun gear 6 and the ring gear 7 of the first minus planetary gear set 3 to the output shaft 8, the planetary gear 2 rotating as unit (that is, in block operation) as result of the closing of the shifting element K1.

In the upper range, a power distribution is provided. To this end, the clutch K2 is closed. Thereby one part of the input power is passed by the input shaft 1 directly to one element of the planetary gear 2, preferably to the web 5 of the first minus planetary gear set 3. Via a second power branch, the input power is passed, via the frictional wheel variator 1, the lateral shaft 9 and the ratio reduction step 10 to one other element of the planetary gear 2, advantageously to the sun gear 6 of the first minus planetary gear set 3. Both power branches are added up (in the first minus-planetary gear set) and the power will be directed to the output shaft 8.

To activate the reverse gear, one provided shifting element Kr, designed as a brake, is closed whereby the direction of rotation of the output shaft is set opposite to the direction of rotation of the input shaft 15.

By virtue of the inventive idea, a compact design of the transmission is achieved; in addition, the transmission can be produced economically and has a high torque capacity, a high efficiency and a high total spreading. Besides, the transmission introduced here is suitable for installation in vehicles having front or all-wheel drive.

What is claimed is:

1. A power distributed 2-range transmission comprising:
   a frictional wheel variator (1);
   a planetary gear (2) arranged coaxially to said frictional wheel variator (1) and detachably connectable therewith via a first shifting element (K2), and the planetary gear having a second shifting element (Kr) and a third shifting element (K1); and
   a lateral shaft (9) which connects said frictional wheel variator (1) with said planetary gear (2); and
   first and second minus planetary gear sets (3, 4), in a first power range, an input power is passed by an input shaft (15) via said frictional wheel variator (1), said lateral shaft (9), a sun gear (6) and a ring gear (7) of the first minus planetary gear set (3) of said planetary gear (2) to an output shaft (8) and in a second power range one part of the input power is passed by the input shaft (15) directly to a web (5) of said first minus planetary gear set (3) of said planetary gear (2), a second part of the input power being passed via said frictional wheel variator (1) and said lateral shaft (9) to said sun gear (6) of said first minus planetary gear set (3) of said planetary gear (2).

2. A power distributed 2-range transmission comprising:
   a frictional wheel variator (1);
   a planetary gear (2) arranged coaxially to said frictional wheel variator (1) and detachably connectable therewith via a first shifting element (K2), and the planetary gear having a second shifting element (Kr) and a third shifting element (K1); and
   a lateral shaft (9) which connects said frictional wheel variator (1) with said planetary gear (2);
   wherein said planetary gear (2) contains first and second minus planetary gear sets (3, 4), a web (5) of said first minus planetary gear set (3) can be detachably connected via the second shifting element (Kr) with a housing (G), a sun gear (6') of said second minus planetary gear set (4) can be detachably connected with said housing (G) via the third shifting element (K1), a ring gear (7') of said second minus planetary gear set (4) is connected with said web (5) of said first minus planetary gear set (3) and a web (5') of said second minus planetary gear set (4) is connected with a ring gear (7) said first minus planetary gear set (3) and of an output shaft (8).

3. A power distributed 2-range transmission comprising;
   a frictional wheel variator (1);
   a planetary gear (2) arranged coaxially to said frictional wheel variator (1) and detachably connectable therewith via a first shifting element (K2), and the planetary gear having a second shifting element (Kr) and a third shifting element (K1); and
   a lateral shaft (9) which connects said frictional wheel variator (1) with said planetary gear (2); and
   a first minus planetary gear set (3), in a first power range, an input power is passed by an input shaft (15) via said frictional wheel variator (1), said lateral shaft (9), a sun gear (6) and a ring gear (7) of the first minus planetary gear set (3) of said planetary gear (2) to an output shaft (8) and in a second power range one part of the input power is passed by the input shaft (15) directly to a web (5) of said first minus planetary gear set (3) of said planetary gear (2), a second part of the input power being passed via said frictional wheel variator (1) and said lateral shaft (9) to said sun gear (6) of said first minus planetary gear set (3) of said planetary gear (2).

* * * * *